United States Patent
Friedrichs et al.

(10) Patent No.: US 7,110,879 B2
(45) Date of Patent: Sep. 19, 2006

(54) METHOD FOR MAKING AVAILABLE ROUTE DATA FOR A NAVIGATIONAL DEVICE

(75) Inventors: Arne Friedrichs, Braunschweig (DE); Gerd Draeger, Braunschweig (DE); Volker Skwarek, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 481 days.

(21) Appl. No.: 10/320,024

(22) Filed: Dec. 16, 2002

(65) Prior Publication Data

US 2003/0158652 A1 Aug. 21, 2003

(30) Foreign Application Priority Data

Dec. 18, 2001 (DE) ................ 101 62 359

(51) Int. Cl.
 G01C 21/32 (2006.01)
 G09B 29/02 (2006.01)
 G01C 21/34 (2006.01)

(52) U.S. Cl. .......... 701/202; 701/201; 701/209; 340/995.12; 340/995.23

(58) Field of Classification Search ........ 701/202, 701/201, 204, 208, 209, 211; 340/995.12, 340/995.19, 995.23
See application file for complete search history.

(56) References Cited

U.S. PATENT DOCUMENTS 5,543,789 A * 8/1996 Behr et al. ........ 340/995.12
5,565,874 A * 10/1996 Rode ........................ 342/457
5,938,720 A * 8/1999 Tamai ....................... 701/209
6,061,003 A * 5/2000 Harada ................. 340/995.15
6,334,089 B1 * 12/2001 Hessing .................... 701/209
6,401,031 B1 * 6/2002 Ogawa ..................... 701/202
6,438,488 B1 * 8/2002 Lee .......................... 701/208
6,438,489 B1 * 8/2002 Sandhu et al. ........... 455/562.1
6,529,143 B1 * 3/2003 Mikkola et al. ......... 340/995.1

FOREIGN PATENT DOCUMENTS

| DE | 100 29 198 | 12/2001 |
|---|---|---|
| DE | 101 05 897 | 8/2002 |
| DE | 101 05 899 | 8/2002 |

* cited by examiner

Primary Examiner—Tan Q. Nguyen
(74) Attorney, Agent, or Firm—Kenyon & Kenyon LLP

(57) ABSTRACT

For the purpose of making available route data for a navigational device, an overall route is divided up into route segments which each include a part of the overall route. A first route segment is transmitted to the navigational device, upon its request, which around the starting point includes a starting field including a plurality of possible routes, as well as a main route to an intermediate destination. Before the intermediate destination is reached, a further route segment is transmitted to the navigational device, which includes a plurality of possible routes around the intermediate destination as its starting field, as well as a main route to an additional intermediate destination or to the destination itself. The latter step is repeated for route segments for further intermediate destinations until the destination is reached.

15 Claims, 2 Drawing Sheets

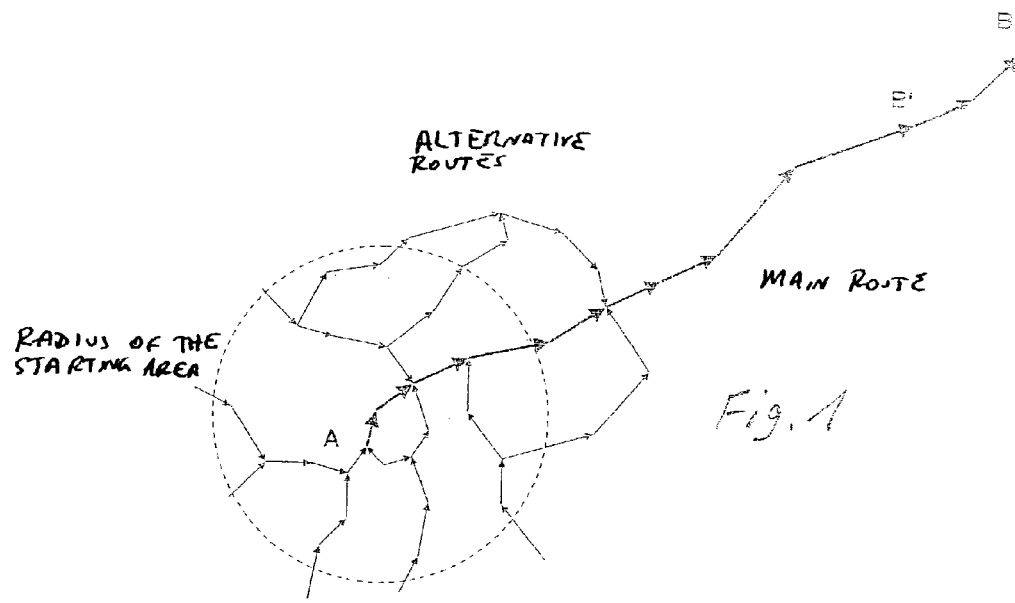
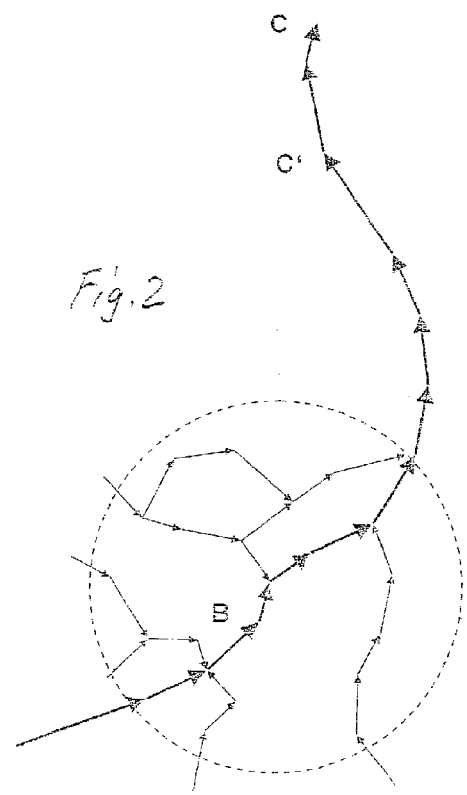
Fig. 1
Fig. 2

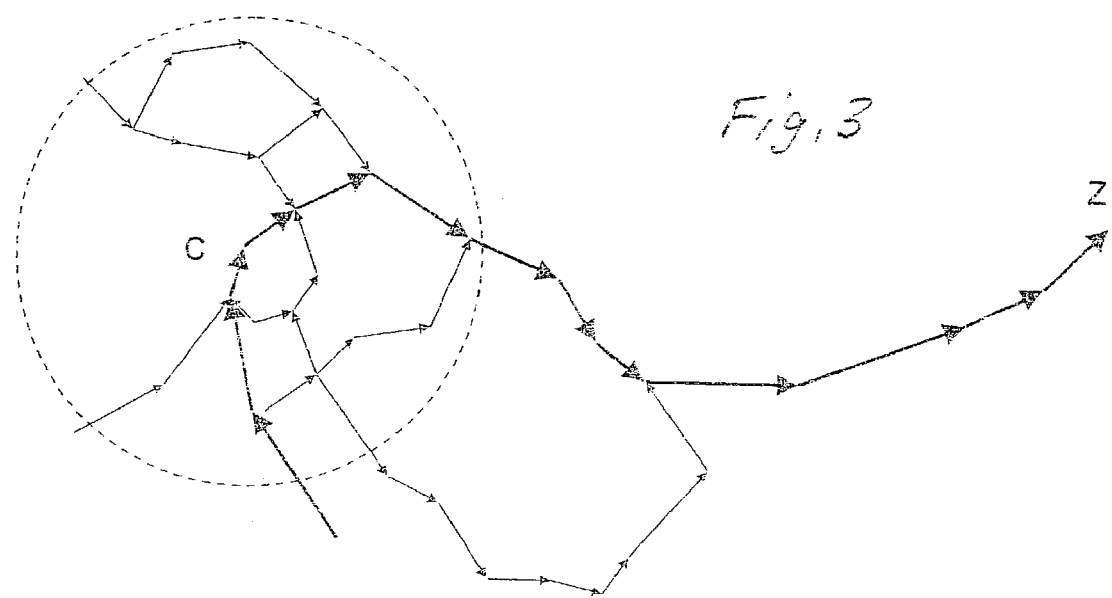

METHOD FOR MAKING AVAILABLE ROUTE DATA FOR A NAVIGATIONAL DEVICE

CROSS-REFERENCE TO RELATED APPLICATIONS

The present application claims priority from Application No. 101 62 359.3, filed in the Federal Republic of Germany on Dec. 18, 2001, which is expressly incorporated herein in its entirety by reference thereof.

FIELD OF THE INVENTION

The present invention relates to a method for making available route data to a navigational device.

BACKGROUND INFORMATION

Conventional offboard navigational devices request route data from a main station and are able to guide the user along this route. Requesting route data requires the communication of map data, or at least waypoints via an air interface which, generally, may produce only rather low transmission rates. In order to transfer the relevant data in an acceptable time via such a low-rate air interface, numerous proposals have already been made for compressing, thinning out or configuring route data.

German Published Patent Application No. 100 29 198 describes an n-fault-tolerant route, German Published Patent Application No. 101 05 899 describes a reduction to decision points and crossing points, and German Published Patent Application No. 101 05 897 describes a method for requesting route data. There, the route data are reduced to the essential data required for exactly the one route. In the first application, a route corridor is described, which, besides the main route, includes all possible first, second, third, (nth) alternative routes. In the second application, a method for thinning out a route is described in that exactly those data are left out which are necessary between crossings only for position finding, but not for navigation. In the third application, a method for requesting route data is described, in which boundary values which have already been determined, maximum storage volume, maximum route length are passed to a server.

SUMMARY

According to the present invention, a route requested by the navigational device is divided into route segments from a starting point to a destination, each of which includes a part of the overall route. A first route segment is transmitted to the navigational device, or rather its navigational unit, upon its request, which around the starting point includes a starting field having a plurality of possible routes, as well as a main route to an intermediate destination on the overall route to the destination. Before the intermediate destination (B) is reached, a further route segment is transmitted to the navigational device, or rather its navigational unit, which, around the intermediate destination as its starting field includes a plurality of possible routes, as well as a main route to an additional intermediate destination on the overall route to the destination or the destination itself. The latter step is repeated, using route segments for further intermediate destinations, until the destination is reached.

The present invention thus provides a method according to which route data for a navigation terminal is segmented into partial routes. A navigation terminal requests a route from its starting point A to a specific destination Z. But since, due to the limiting parameters (data memory, number of route points, etc.), the complete route A–Z may not be delivered, the route is segmented into several partial sections or partial routes between A and Z. In this context, each segment may reveal itself in its basic shape like a club, i.e., there is a larger digitized field at the starting point than on the rest of the route.

The method according to the present invention may be used in so-called offboard navigational devices, in which a route is requested of a server by a navigational terminal. However, this method may also be used in the usual so-called autonomous navigational devices, in which a segment of a route may be loaded into a volatile RAM memory by a CD-ROM.

In an example embodiment of the present invention, data are additionally transmitted which may influence processes on the server end. Among these belong, for example, the distance from the intermediate destination to the starting point and the final destination, in order to supply heuristic routing methods with the appropriate boundary information, and thus to be able to compute the same route from each intermediate point.

According to the present invention, a completely computed route is divided up into several segments in such a manner that each segment is made up of one part of the overall route A–Z, so that the starting area of a segment includes a digitized starting field, the intermediate destination of a segment lies within the starting field of the following segment, and the travel time, the distance from A, B, C, D, . . . to Z is stored as further information.

A further development of each segment is to be seen in that each intermediate destination B, C, D, . . . lies on the main overall route A–Z, the route data are filled up with data beginning at the destination.

Alternative:

starting field size a function of vehicle speed, road classification, position-finding type (position-finding accuracy).

In an example embodiment of the present invention, when there is a follow-on request by the terminal, a routing-relevant parameter block is transmitted to the routing service, which sets heuristic parameters of the algorithm. Only in that manner may it be ensured that a new routing procedure from an intermediate destination to the destination leads to exactly the same route as the original routing at the start via the intermediate destination to the destination. In the case of these heuristic parameters, for example, the distance of the intermediate destination from the starting point and the destination may be given.

The present invention, among other things, may provide that: If a partial route occupies the entire RAM memory of a nvigational terminal, the terminal has to switch over to the next partial route when the partial route intermediate destination is reached. This procedure may take some time, since, for instance, data have to be deleted from the memory and others have to be newly loaded. Only when the route data necessary for position finding and so-called map matching method have been completely loaded into the RAM memory, may the navigational terminal continue with the navigation. During this time, a navigational terminal is not navigating. Even a position in a partial route may not be determined. However, since the vehicle, in the meantime, has moved on by a certain distance, it may not be assumed that the vehicle is located exactly at the starting node of the follow-on partial route. In this respect, the starting field of the partial route, according to the present invention, may provide that, since hereby the probability, the position of the vehicle is found again in this starting field, is greatly increased.

If the map data of the starting field are filled in, according to the method of the present invention, for a plurality of possible routes, e.g., "all possible routes within the starting field", it may be ensured that a vehicle within the starting field may be pinpointed with driving instructions even on a directed route. This means that the user may be guided from this new point to the destination even without a detour, which may provide that the driver does not have to be guided back to the starting point by a turnabout maneuver.

The route data for an entire partial route may be filled in in sequence from the starting point, beginning in the direction towards the destination, that the navigational terminal may already navigate using the first (incomplete) part of the route.

The present invention is described below in detail, in light of the drawings.

BRIEF DESCRIPTION OF THE DRAWINGS

FIG. 1 shows a first route segment for a first partial route A–B.

FIG. 2 shows a second route segment for a second partial route B–C.

FIG. 3 shows a route segment for a partial route up to destination Z.

DETAILED DESCRIPTION

Assuming a defined overall route A–Z, the method according to the present invention supplies a first partial route (route segment) A–B, see FIG. 1. A partial route includes as route data the map geometry, driving instructions, distances and travel times. Partial route A–B has the characteristic that it includes at least one of the following boundary values:

max. RAM memory of the navigational terminal
max. length
max. travel time
max. fuel usage The starting field of a partial route of a route segment may assume different forms and may include a different information content. In this connection, the starting field may assume any shape, such as a circle, a club, a drop, etc. In this context, the information content or the size is determinable by one of the following parameters:

position-finding quality, positioning accuracy of the vehicle (such as position-finding type, accuracy data in meters, . . . )
size of the shape (such as circumference, radius, diameter, . . . ).

Within the route segment, about starting point A, a plurality of possible routes are indicated on the display of the navigational device, as well as the main route to intermediate destination B.

In an example embodiment of the present invention, during a follow-on request, further parameters are transmitted by the navigational terminal to the server, which influence the routing algorithm in the server. This may ensure that the route from the intermediate destination may be continued exactly the same as it was computed from the start.

A user wishes to be guided by his so-called offboard navigational unit from his actual starting point A to a destination Z. For this, he enters the destination information in the form of city name and street name and house number into the offboard navigational unit. After he has confirmed the route request to a server, the route request is broadened by the offboard navigational unit by the parameters "maximum memory volume 100 kbyte" and "starting field radius=1000 m".

An overall route A–Z is computed in the server. Starting from the starting point, a partial route is compiled. All relevant map data at a distance of the requested 1000 m about the starting point are collected. Starting from each point found within these 1000 m, routes are computed to the next nearest point of main route A–Z, which are all filled into the partial route. If the starting field around A is filled in, beginning at A, all route data of main route A–Z are collected and taken up into the partial route. This process ends only when a point is reached at which the partial route has reached a magnitude of 100 kbyte. The last filled-in point of the partial route is marked B, which represents an intermediate destination on the main route A–Z. The partial route has the property that it has the maximum magnitude of 100 kbyte and that it includes all route data in a starting field having a radius of 1000 m.

This partial route A–B is transmitted to the offboard navigational unit. Since the vehicle has distanced itself from the original location A to location A', the offboard navigational unit may have to perform a new association between the position of the vehicle and the map data, so-called map matching. After this is taken care of, and the correct street has been found, navigation may begin.

After a distance of the way has been covered in a corresponding time, the driver reaches point B', which is at a certain distance before intermediate destination B. Point B' is selected so that a route request, which at this point in time is dispatched to the server at maximum speed of the vehicle, has a new partial route delivered to the offboard terminal at the latest at point B. Thus, the offboard navigational unit sets up a new request at point B', while the vehicle moves on and is also navigated. The parameters "distance from start=50 km, destination distance=100 km" may also be transmitted. Shortly before reaching intermediate destination B, the offboard navigational terminal has received partial route B–C as in FIG. 2, which was set up by the server in the same manner as partial route A–B before it. Now the display of the offboard navigational unit shows a straight-ahead arrow including an hourglass and an advisory notice "new partial route being loaded", so that the driver is given the information that for a moment there will be no navigation. After the starting field for partial route B–C has been loaded into the RAM memory, map-matching may be performed and navigated. The hourglass and the advisory notice disappear from the display, and the driver is once again being navigated by the offboard navigational unit.

This procedure is repeated for further partial routes all the way to destination Z or as in the exemplary embodiment described for partial route C–Z (FIG. 3), using the last requested and desired destination Z.

In the method according to the present invention, during the trip, switching between partial routes occurs in a recognizable manner, for instance, by the fading in of a menu or of advisories concerning an intermediate destination from the terminal.

By contrast to conventional solutions, no wrong travel may occur after the route follow-on request. If correct navigation occurs on the new route, the vehicle is located within the route request periphery which is formed for increasing the probability of capture of the vehicle.

What is claimed is:

1. A method for making available route data for a navigational device, comprising:
   dividing up a route from a starting point to a destination requested by the navigational device into a plurality of route segments each including a part of the route;
   transmitting a first route segment to a navigational unit of the navigational device upon request, the first route segment including a starting field around the starting point, the starting field including a plurality of possible routes and a main route to an intermediate destination on the route to the destination;
   transmitting a second route segment, before the intermediate destination is reached, to the navigational unit of the navigational device, the second route segment including a plurality of possible routes around the intermediate destination as a starting field and a main route to one of an additional intermediate destination on the route to the destination and the destination; and
   repeating the second route segment transmitting step for additional route segments for additional intermediate destinations until the destination is reached.

2. The method of claim 1, further comprising selecting the intermediate destination of a route segment within a starting field of a subsequent route segment.

3. The method of claim 1, further comprising:
   transmitting to the navigational device as additional information at least one of a travel time and a distance to the starting point to at least one of at least one intermediate destination and the destination.

4. The method of claim 1, further comprising determining the starting field for the route segment with respect to one of information content of the route segment and a size of the route segment by at least one of a position finding quality, a positioning accuracy, a shape of the starting field, a circumference of the starting field, a diameter of the starting field and a radius of the starting field.

5. The method of claim 1, further comprising transmitting, in response to a follow-on request of the navigational device to a server, a plurality of parameters that influence a routing algorithm so that a route starting from an intermediate destination is continued exactly as computed starting from the starting point.

6. The method of claim 1, further comprising selecting a size of the starting field as a function of at least one of a vehicle speed, a street classification, a position-finding type and a position-finding accuracy.

7. A method for making available route data for a navigational device, comprising:
   dividing up a route from a starting point to a destination requested by the navigational device into a plurality of route segments each including a part of the route;
   transmitting a first route segment to a navigational unit of the navigational device upon request, the first route segment including a starting field around the starting point, the starting field including a plurality of possible routes and a main route to an intermediate destination on the route to the destination;
   transmitting a second route segment, before the intermediate destination is reached, to the navigational unit of the navigational device, the second route segment including a plurality of possible routes around the intermediate destination as a starting field and a main route to one of an additional intermediate destination on the route to the destination and the destination;
   repeating the second route segment transmitting step for additional route segments for additional intermediate destinations until the destination is reached; and
   providing an advisory notice on a display unit during a time period of loading a route segment into a display unit of the navigational device that no navigation is occurring.

8. The method of claim 1, further comprising:
   transmitting to the navigational device as additional information at least one of a travel time and a distance from the starting point to at least one of at least one intermediate destination and the destination.

9. The method of claim 1, further comprising:
   transmitting to the navigational device as additional information at least one of a travel time and a distance from the intermediate destination to at least one of the starting point and the destination.

10. The method of claim 1, wherein the route segments are loaded into a volatile memory by a CD-ROM.

11. The method of claim 1, wherein each intermediate destination lies on a main route from the starting point to the destination.

12. The method of claim 1, wherein each of the route segments includes at least one of a map geometry, driving instructions, and travel times.

13. The method of claim 1, wherein each of the route segments is restricted to at least one of a maximum available memory of the navigational device, a maximum length, a maximum travel time, and a maximum fuel usage.

14. The method of claim 1, wherein each starting field includes additional starting points, and wherein the possible routes include routes from each of the additional starting points.

15. The method of claim 1, further comprising:
   performing map matching after a segment of the plurality of segments is loaded.

* * * * *